United States Patent [19]

Ibamoto et al.

[11] Patent Number: 5,018,072

[45] Date of Patent: May 21, 1991

[54] OPTICALLY READABLE MAIL SYSTEM WITH GENERAL AND RECEIVER SPECIFIC INFORMATION

[75] Inventors: Masahiko Ibamoto, Katsuta; Yasuo Morooka, Hitachi; Hiroaki Koyanagi, Katsuta; Manabu Sato; Takeshi Mizumura, both of Hitachi, all of Japan

[73] Assignee: Hitachi, Ltd., Tokyo, Japan

[21] Appl. No.: 492,225

[22] Filed: Mar. 13, 1990

Related U.S. Application Data

[63] Continuation of Ser. No. 228,112, Aug. 4, 1990, abandoned.

[30] Foreign Application Priority Data

Aug. 18, 1987 [JP] Japan ................................ 62-204044

[51] Int. Cl.[5] ................................................ G06F 15/20

[52] U.S. Cl. ......................................... 364/478; 360/2; 369/64; 235/375

[58] Field of Search .............. 364/478, 464.02, 464.03; 235/375, 432; 360/2, 55, 137; 369/14, 64; 434/311-313

[56] References Cited

U.S. PATENT DOCUMENTS

| | | | |
|---|---|---|---|
| 4,194,685 | 3/1980 | Hill et al. | 235/375 |
| 4,384,196 | 5/1983 | McCumber et al. | 235/375 |
| 4,585,220 | 4/1986 | Zemke et al. | 364/478 X |
| 4,796,196 | 1/1989 | Durst, Jr. et al. | 364/478 |

*Primary Examiner*—Joseph Ruggiero

*Attorney, Agent, or Firm*—Kenyon & Kenyon

[57] ABSTRACT

A mail system includes a selector selectively composing character information, image information and/or audio information; a printer printing the composite information as optically readable bit information in a plurality of recording mediums; a first storage device storing specific information for specifying the receivers of said recording media; a second storage device storing the required items of said receivers; a third storage area storing the information related to the required items of said receivers; a selector selecting information corresponding to the required items of said receivers from the information related to the required items of said receivers; a recorder recording the selected information corresponding to the required items of said receivers as optically readable bit information in at least one of said recording media; and a recorder recording the specific information specifying said receivers in at least one of said recording media.

31 Claims, 8 Drawing Sheets

OPTICALLY READABLE MAIL SYSTEM WITH GENERAL AND RECEIVER SPECIFIC INFORMATION

This application is a continuation of application Ser. No. 07/228,112, filed 08-04-1990 abandoned.

BACKGROUND OF THE INVENTION

The present invention relates to an individually addressed information transmission system for recording data demanded by a receiver in addition to general-purpose mass information and, more particularly, to a mail system for additionally recording required data suitable for transmitting stock or credit information.

For the direct mails of the prior art, post cards or leaflets have been used which are printed with the general information and additionally with the address and name of a receiver as the individual data. As in Japanese Laid-Open Patent Publication No. 61-15267 (1986), on the other hand, there has been reported an example in which are incorporated the individual data including the birth day, wedding anniversary, and Buddhist service items of a specific customer. However, all of these data are selected merely for convenience of the mail sender but not required by the receiver. In order to additionally print the personal information in addition to the general information printed in a great amount, the data stored in the computer are usually printed out by the printer. However, so much data cannot be additionally recorded, but it is the current practice to print several lines of characters at most especially in case the post cards are used.

Since much information cannot be additionally recorded, the prior art is accompanied by a problem that a sufficient amount of information required by the receiver cannot be printed resulting in a failure to attract the interest of the receiver.

SUMMARY OF THE INVENTION

An object of the present invention is to provide a mail system which can have a great amount of additionally recorded information to solve the above-specified defect.

This object can be achieved by a mail system which comprises a selector selectively composing character information, image information and/or audio information; a printer printing the composite information as optically readable bit information in a plurality of recording mediums; storage storing specific information for specifying the receivers of said recording media; a second storage storing the required items of those who are to receive the mail; third storage storing information related to the required items of those who are to receive the mail; a second selector selecting information corresponding to the required items of said receivers from the information related to the required items of said receivers; a recorder recording the selected information corresponding to the required items of said receivers as optically readable bit information in at least one of said recording media; and a second recorder recording the specific information specifying said receivers in at least one of said recording media.

Since a recording medium stores the general information shared among a majority of receivers and additionally the information required by each of the receivers, it is possible to increase the interest of the those who are to receive the mail thereby enhance the publicity and advertisement.

DETAILED DESCRIPTION OF THE PRESENT INVENTION

Figure 1:
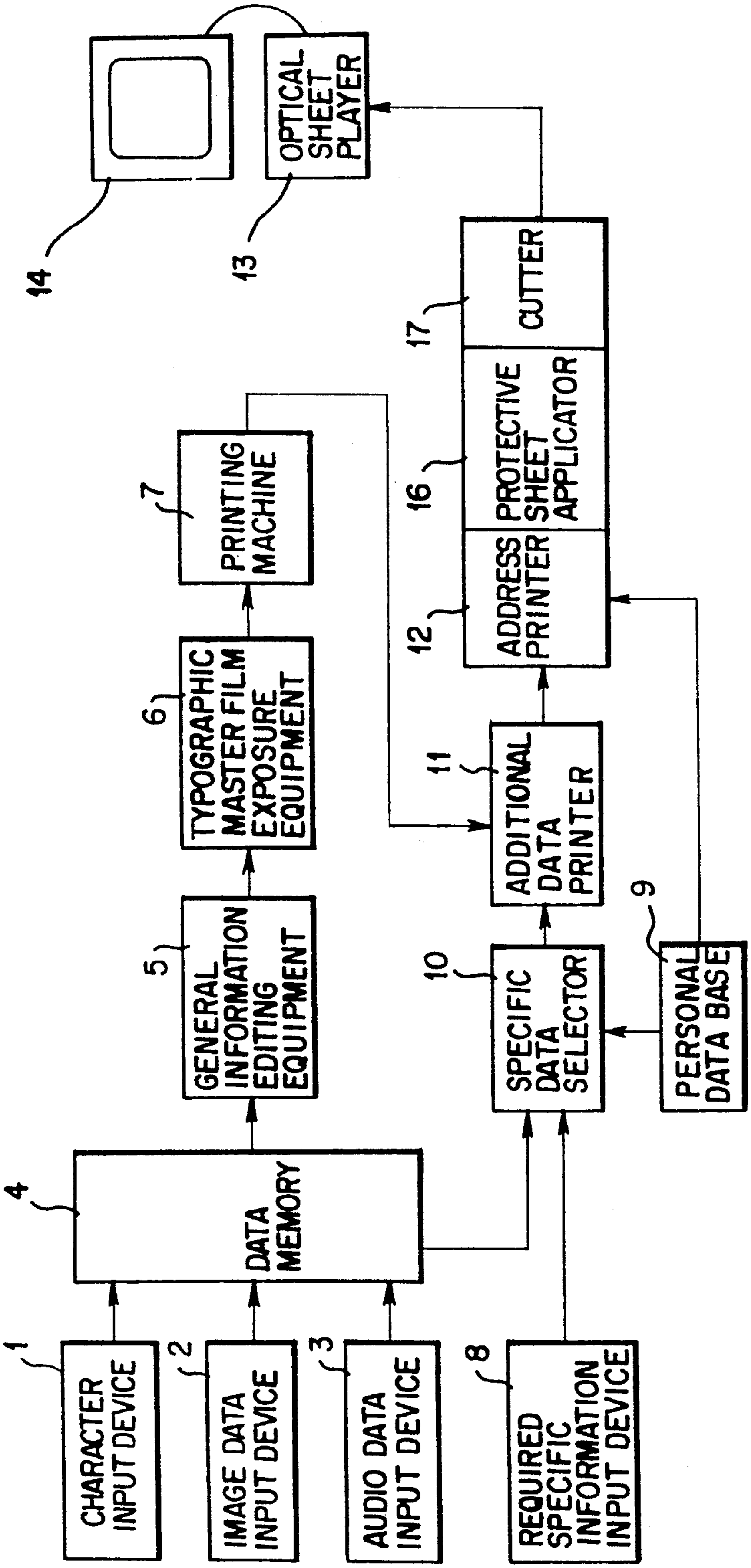
FIG. 1 is a block diagram showing the system configuration of one embodiment of the present invention.

The present invention will be described below in connection with one embodiment thereof with reference to FIG. 1. There is provided a data memory 4 for storing information fetched from an input device such as a character input device 1, e.g., a word processor or engineering work station, an image data input device 2, e.g., a TV camera or an image scanner, or an audio data input device 3, e.g., a microphone or synthesizer. This data memory 4 further stores another detailed information.

A general information editing equipment 5 combines those data and edits them into common information for a number of receivers. The general information thus edited is converted into bit information by a typographic master film exposure equipment 6, and a typographic master film for mass printing is prepared and used by a printing machine 7.

In a stock company, for example, stock price trends, market outlooks or PR scenes to be transmitted to general customers are edited into plain and attractive video programs and printed as bit information to be optically read out into the general information areas of direct-mail post cards.

Incidentally, the stock company has to inform its individual customers of different pieces of information such as the dealing records of stock held by the customer or the detailed data of individual brands, e.g., the fluctuations or outlook of the stock. Therefore, the required item concerning what data are required by the customer is registered in a required specific information input device 8. As one of the required items, there are also registered data designating the order of reproduction depending upon what item the customer wants to observe at first.

Incidentally, the required items to be stored in the required specific information input device 8 can be rewritten or changed by a change device (not illustrated) in accordance with the desire of the receiver or customer.

On the other hand, the specific data for specifying the customer, such as the address, name or identification code of the customer necessary for the direct mail are stored in a personal data base 9.

In accordance with the required item specified by the required specific information input device 8 in a manner to correspond to the customer data of the personal data base 9, a specific data selector 10 selectively fetches the information related to the required item such as the detailed data related to the brand of a held stock or the dealing data of the customer from the data memory 4 and additionally writes it as required individual information in an area, other than that for the general information earlier printed, by an additional data printer 11. At this time, at least a portion of the personal specific data is written in a predetermined area such as the edge of paper and is useful for recognizing as addressed to the customer in a later-described optical sheet player.

The paper having its optical recording side totally written by the printing machine and the additional data printer is printed at its address column with human-readable characters such as the address, name and zip code by an address printer 12. The paper thus printed is shaped into the form of a post card through the step of applying a protective sheet and the step of cutting.

The paper thus having a post card shape and recorded with much information as the bit information like the optical disk will be called the "optical post card" in the following.

When the customer inserts the optical post card received into the optical sheet player 13, the image and sounds are reproduced in a display 14 so that he can get individual information he requests in addition to general information.

Figure 2:
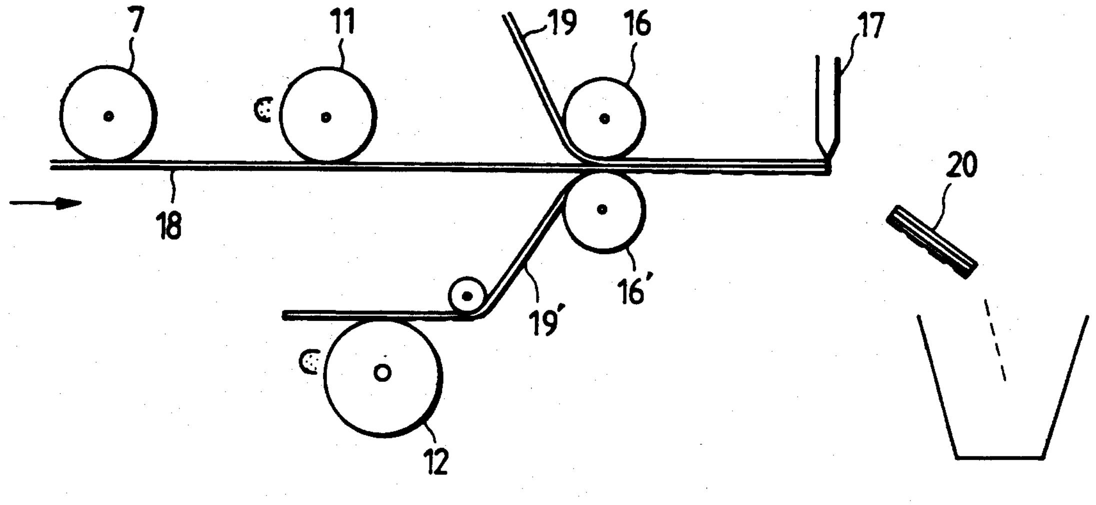
FIG. 2 is an explanatory view showing the configuration of the printing, additional printing, address printing, protective sheet applying and cutting portions of the embodiment of the present invention.
Figure 3:
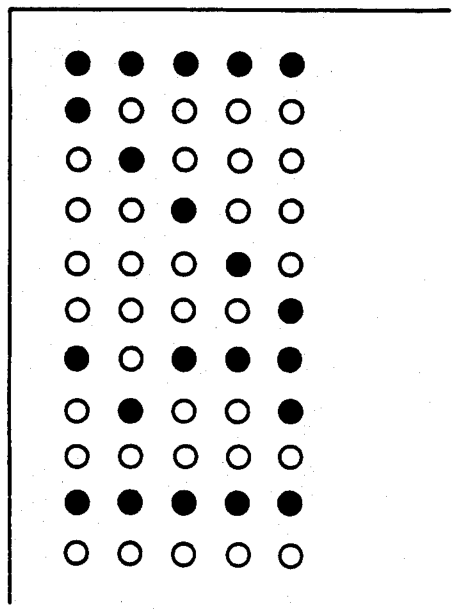
FIG. 3 is a schematic diagram showing one example of the recorded pattern according to the system of the present invention.

The description thus far covers the whole system. Specific examples of the individual parts will be described in the following. FIG. 2 shows the system in which the printing machine 7, the address printer 12, a protective sheet applicator 16 and a cutter 17 are combined. First of all, the general information is transferred from the typographic master film recorded in its surface with the bit information by the printing machine 7 and is printed on a continuous sheet 18 of optical post cards or a recording medium being fed continuously from the lefthand side. As a result, the continuous sheet 18 is recorded in its surface with white or black dots or pits having a depth of about 0.1 μm, as shown in FIG. 3. If these dots have a pitch of about 10 μm, for example, as has been described hereinbefore, it is possible to print and record information on the order of 100 kilobytes per $cm^2$. This high-precision mass printing can be accomplished by a foil transfer method.

The optical recording is effected by dividing information such as images, sounds or characters into bit signals and by recording optically readable fine dots in the sheet-shaped recording medium. If a laser diode is used as the reading light source, the minimum diameter of the dots can be reduced to about 1 μm in accordance with the diameter of the condensation limit determined depending upon the wavelength of the laser diode.

This recording method is well known in the art as the optical disk which can record information as dense as 10 megabytes per $cm^2$.

Even if the dot pitch is set at 10 μm considering that much information is copied through the copying or transferring method, the storage capacity is as high as 100 kilobytes per $cm^2$ so that the area of the post card can store information on the order of 10 megabytes.

If, on the other hand, the dot pitch is set at 100 μm only at the additional portion considering that the dots are to be additionally written by the printer, the recording density can be on the order of 1 kilobytes per $cm^2$.

Therefore, if a sheet of a post card has its half area printed with the general information in dots of 10 μm φ and its remaining half area printed with the additional information in dots of 100 μm φ, the general information area can store two or three color still images and 3 to 4 minutes of music, whereas the additional area can store character information in several tens of A-4 size sheets.

In FIG. 2, the printed continuous sheet 18 is then written with required individual information by the additional data printer 11, which can be exemplified by a well-known laser printer, for example. This additional area is also printed in the black and white dots, as shown in FIG. 3. If this dot pitch is set at 100 μm, for example, as has been described hereinbefore, the writing density can be 1 kolobytes per $cm^2$. Since the laser beam printer can have a recording resolution of several ten micron meters, it can sufficiently write the dots having the pitch of 100 μm. If the laser beam printer is thus used as the additional data printer 11, the computer output can be directly written without any printing typographic master film so that the required individual information different among the customers can be written.

Protective sheets 19 and 19' are applied to the continuous sheet 18, which has been written with the general information and the required individual information, so that the continuous sheet 18 may be prevented from being blotted. These protective sheets are partially printed with readable visible information such as the zip code, address and name of the customer by the address printer 12. The protective sheet 19 to be applied to the printing front of the continuous sheet 18 can be printed with not only a note that it should be peeled before the play but also free patterns so as to effect enough publicity and advertisement from appearance like the general direct mails.

The continuous sheet 18 emanating from the protective sheet applicator 16 is cut to have a length of the post card by the cutter 17. If the continuous sheet 18 has its width adjusted to that of the regular post card, the cut sheets can be used as they are as the post cards. The cut sheets can naturally be delivered as the postal matters, if they either use the protective sheet 19 printed in advance with stamps of separate payment of postage or are printed with the stamps of separate postage payment together with the address by the address printer 12.

Figure 4A:
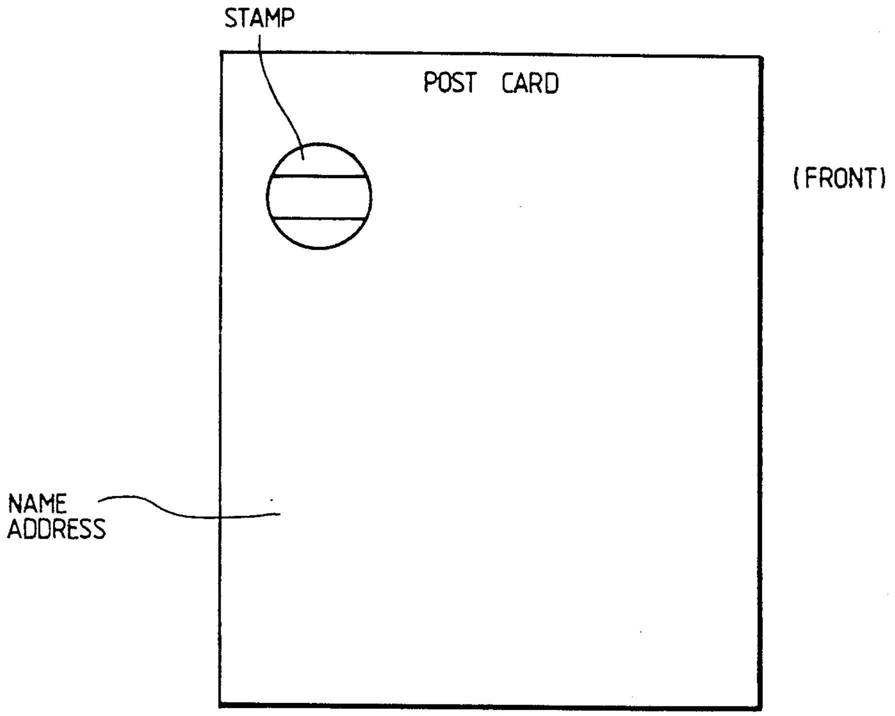
FIGS. 4(*a*) and 4(*b*) are schematic diagrams showing the structure of a post card prepared according to the system of the present invention.
Figure 4B:
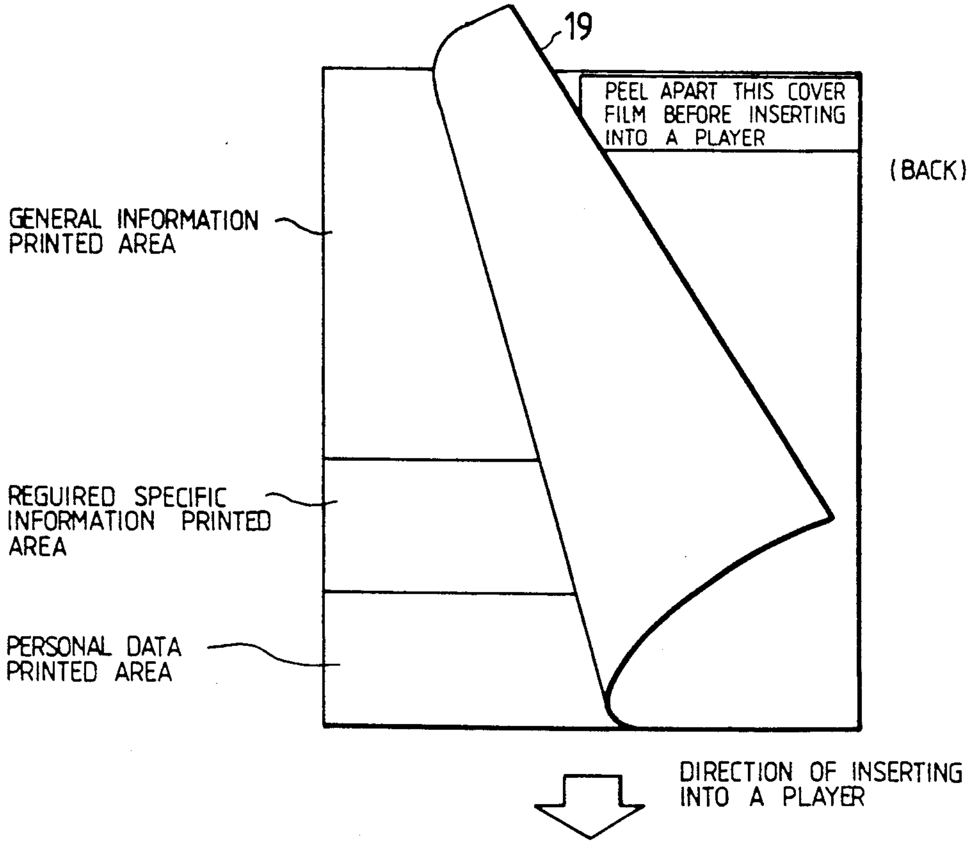

The optical post card 20 thus prepared is shown in FIGS. 4(*a*) and 4(*b*). The side or back stored with the information is so divided, as shown, that the image and sounds are reproduced in the display 14 only both in case the post card 20 is inserted into the optical sheet player 13 such that the personal data printed area is read in before and in case the code number written in the personal specific data is coincident with that stored in advance in the optical sheet player.

Figure 5:
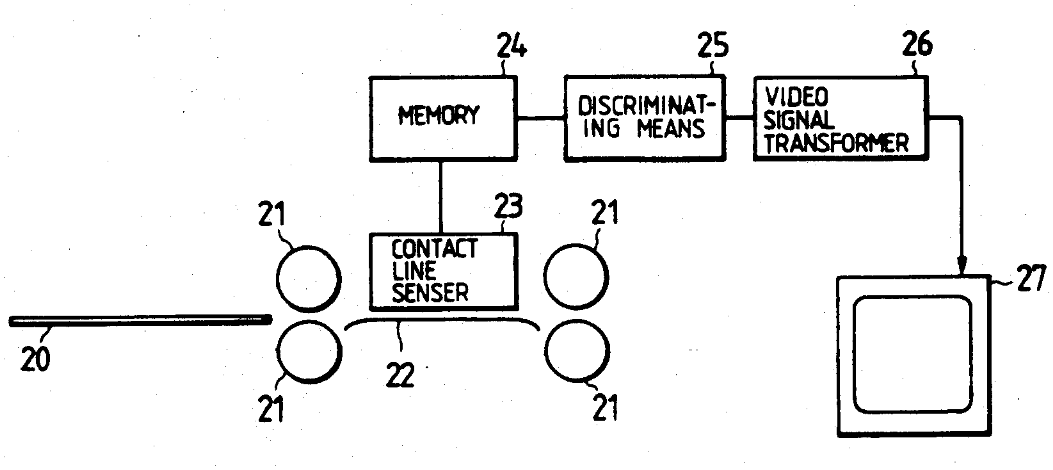
FIG. 5 is a diagram showing one embodiment of the optical sheet player of the system of the present invention.

An example of the configuration of the optical sheet player is shown in FIG. 5. When the optical post card 20 is inserted into the player, feed rollers 21 convey it over guide shoes 22. While moving below a contact line sensor 23, the optical post card 20 has its recorded bit information read out and reproduced in the order of the personal data printed area, the required specified information printed area and the general information printed area. The contact line sensor 23 is so highly fine as to read out the bit information from the side printed with the general information and is suitably exemplified by a CCD line sensor having a pitch of 10 μm. This line sensor is equipped with an imaging optical system, by which the real image of the printed front is projected upon the photosensitive face of the line sensor so that the printed information is detected in terms of changes in the current of the photosensitive element. The information thus detected is once stored in a memory 24 and is reformed by discriminating means 25. Since the general information is recorded in the fine dots having a pitch of 10 μm, the detected signals are as they are the reproduced information if the general information is read out by the line sensor having the same pitch. On the contrary, the additional data printed area requires the memory 24 and the discriminating means 25 because signals having a pitch of 100 μm have to be discriminated from the detected signals and reproduced in case the additional data are recorded with a coarser pitch of 100 μm, for example, than that of the general information. With this construction, it is possible to reproduce both of the data which are recorded in the dots having different pitches.

The reproduced signals are transformed by a video signal transformer 26 into video signals, which can be reproduced by an existing display 27, so that their image and sounds are reproduced.

Incidentally, the discriminating means 25 can have a function to compare for judgment the identification code of the specific personal data written at first with the code stored in advance and to reproduce all the data, if the data are surely addressed to the receiver, but otherwise to display the message for reproduction inhibition and stop the operation. With this function preset, the optical post card can not be reproduced by another optical sheet player if it is misdelivered to another customer, to keep the privacy.

Figure 6:
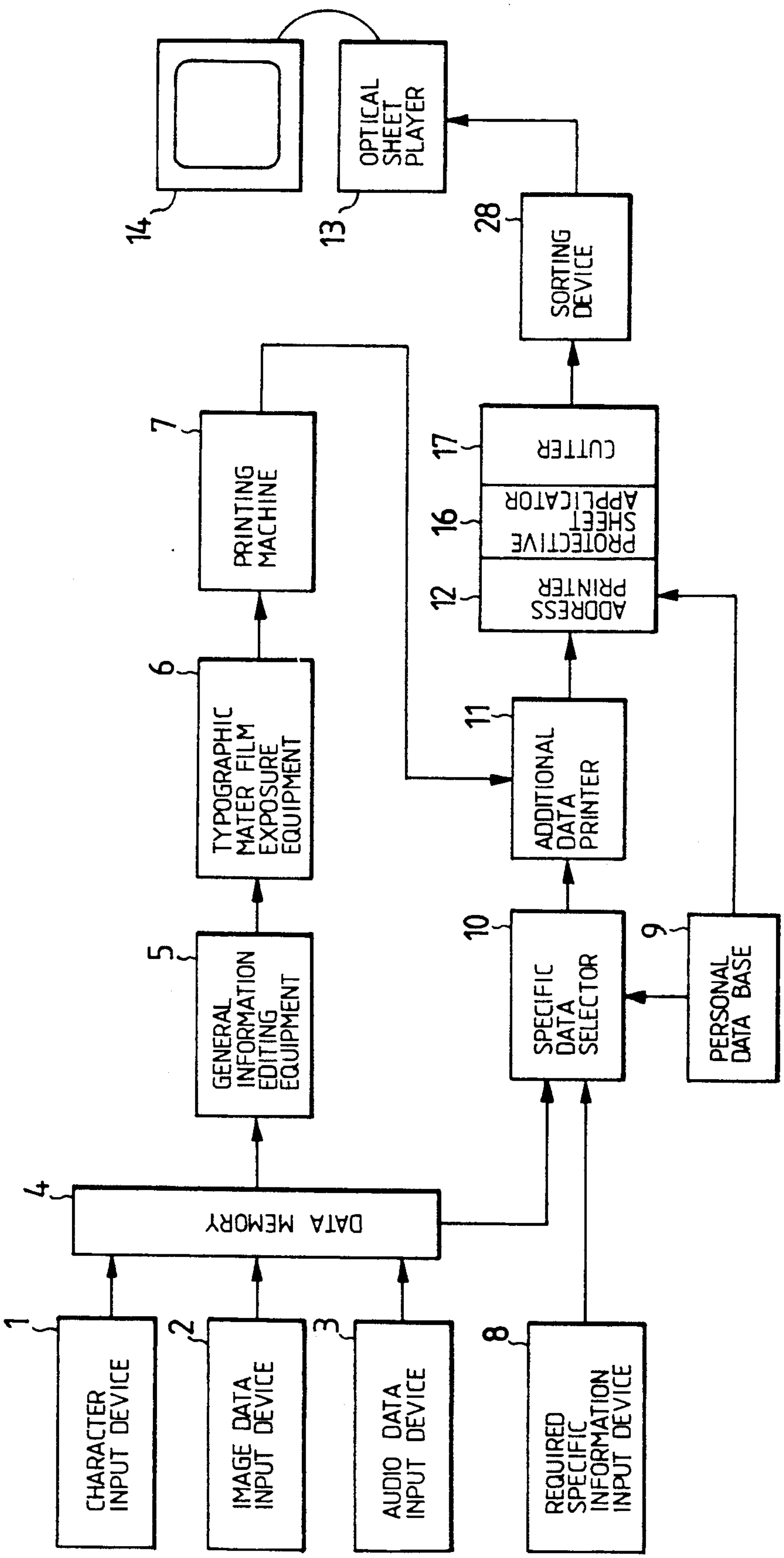
FIG. 6 is a block diagram showing the configuration of the system according to a second embodiment of the present invention.

FIG. 6 is a block diagram showing the case in which the system of the present invention is developed to incorporate an automatic sorting device. The portions of the system upstream of the cutter 17 are similar to those of the case of FIG. 1, and their descriptions will be omitted.

The completed optical post card 20 has the structure shown in FIG. 4. The protective sheet 19 need not be peeled for the reading operation if the protective sheet 19 is transparent at the portion covering at least the edges and the personal data printed area. Especially the personal specific data are additionally printed and are recorded in the dots having the pitch of 100 μm so that they can be easily read out through the protective sheet. Those optical post cards can always be either rearranged in the order of customers listed or distributed according to districts by reading out the personal specific data through a sorting device 28 even if they are cut out of order by the cutter 17.

Figure 7:
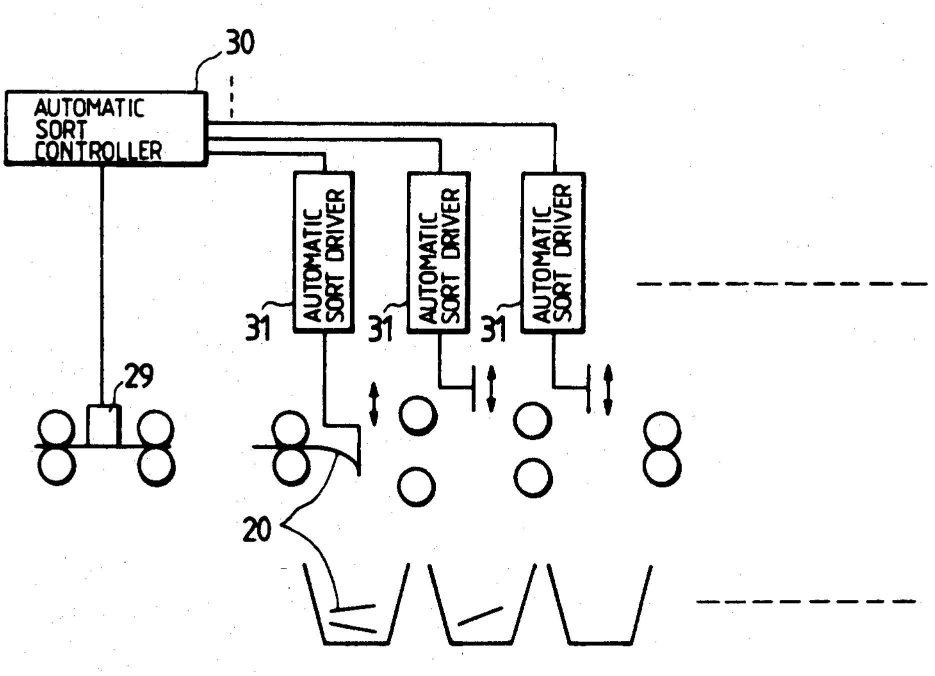
FIG. 7 is an explanatory view showing the structure of a sorting device.

Next, one embodiment of the automatic sorting device 28 will be described with reference to FIG. 7. The address codes of a person are printed in the personal data printed area and read out by an optical reader (e.g., an optical system using a laser or a CCD array sensor) 29. The address data thus read out are the inputs to an automatic sort controller 30. Control signals emanating from this controller 30 control an automatic sort driver 31. In case the control signals of the address data of a specific district come, the corresponding automatic sort driver 31 operates to drive the optical post card 20 into a box designated for the specific district. By the use of the sorting device, the optical post cards can be sorted more precisely than by reading the numerical symbols of the prior art.

Figure 8A:
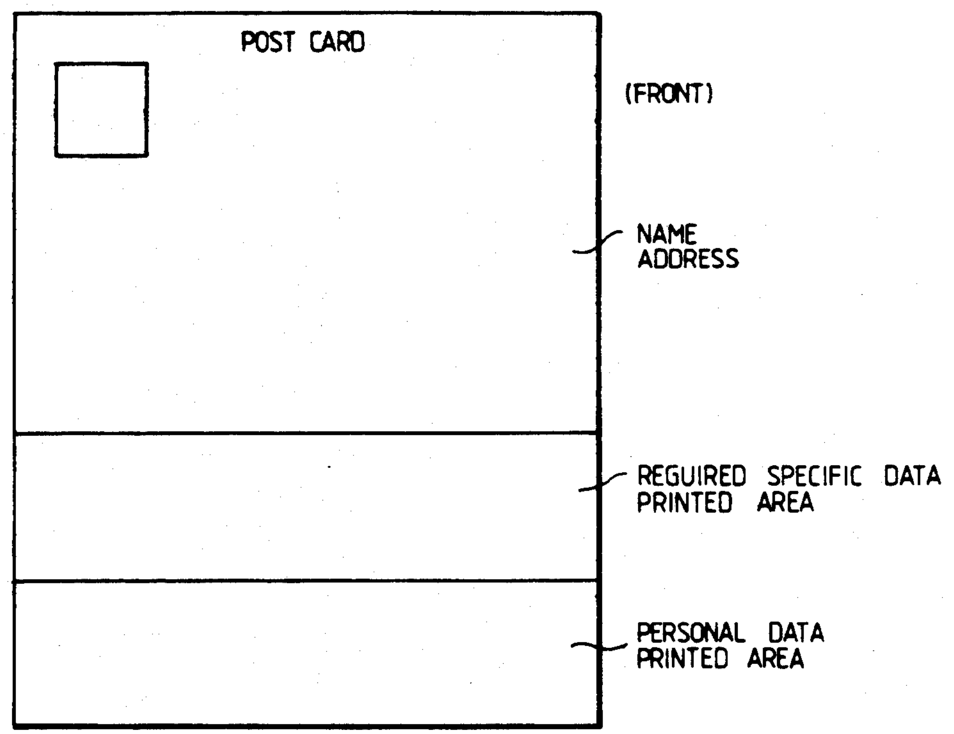
FIGS. 8(*a*) and 8(*b*) are diagrams schematic showing another example of division of the recording areas of an optical post card.
Figure 8B:
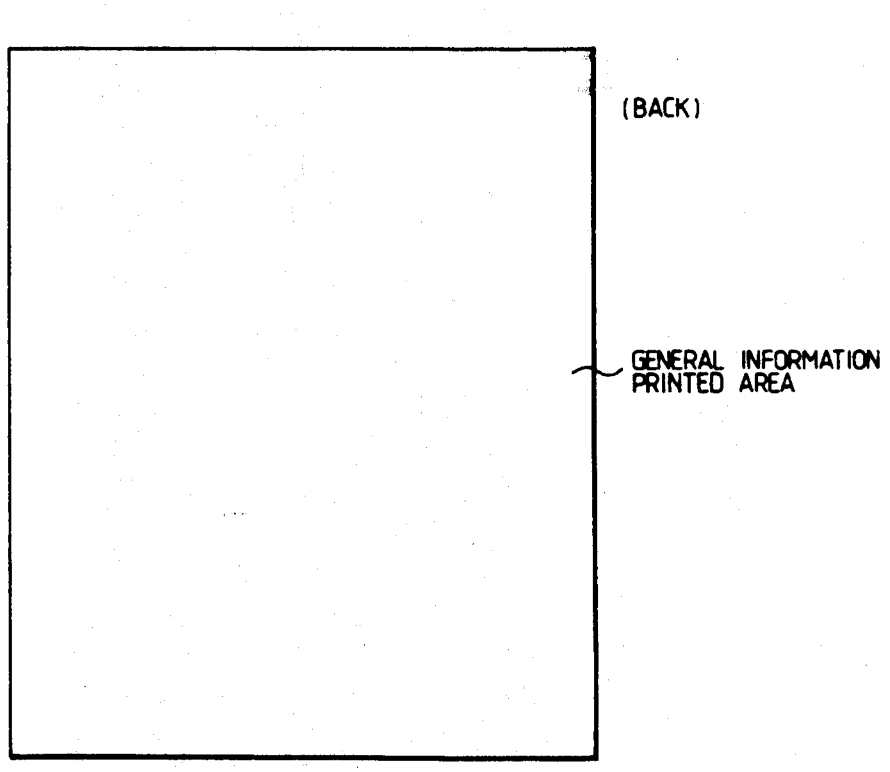

FIGS. 8(*a*) and 8(*b*) show another mode of the optical post card to be used in the present invention. Since the post card is allowed to use its lower half below the address area as a space for message, the lower half is provided for the additional recording whereas the back is recorded all over the area with highly fine general information.

Thus, the amount of information to be recorded can be dramatically increased, and the optical post card can have its one side made of a foil suited for printing fine dots and its other side made of paper suited for the additional printing so that the two sides can be recorded and reproduced with respectively high S/N ratios.

Figure 9:
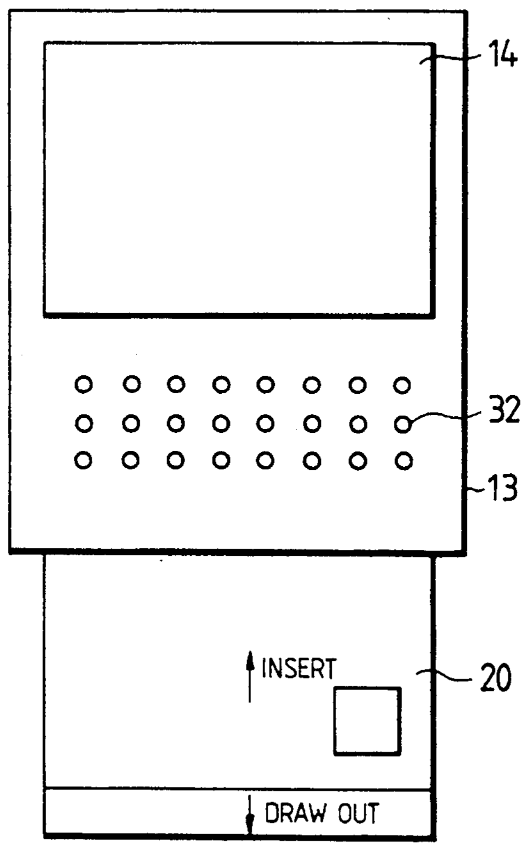
FIG. 9 is a schematic diagram showing another embodiment of the optical sheet player.

Next, another embodiment of the optical sheet player will be described with reference to FIG. 9. This player is modified by assembling the information reader, the display 14 and an audio converter 32 altogether so that it can be compact and freely portable. In this player, moreover, the directions of inserting and drawing out the sheet-shaped recording medium are opposite to each other. This makes it feasible to draw out the recording sheet.

Figure 10:
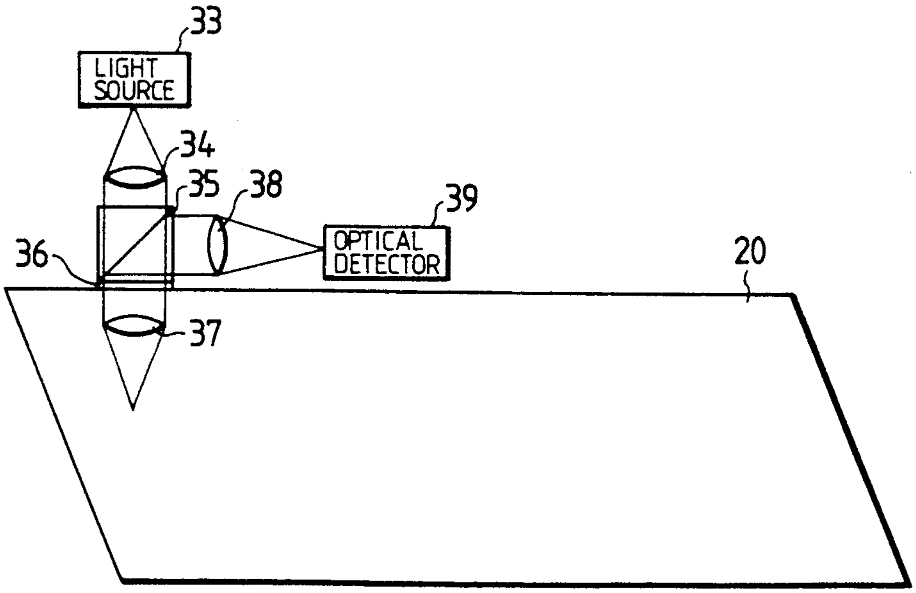
FIG. 10 is a diagram showing the structure of a second embodiment of the reading portion of the optical sheet player.

Next, one embodiment of the optical information reader will be described with reference to FIG. 10. The optical beam emitted from a light source 33 is collimated by a collimation lens 34 into parallel rays. These parallel rays are guided through a polarization beam splitter 35 and a λ/4 plate 36 and condensed into a spot of 5 to 15 μm on the aforementioned optical post card 20 by the action of a condenser lens 37. The spot is reflected by the optical post card 20 and is guided again through the condenser lens 37 and the λ/4 plate 36 into the polarization beam splitter 35. This beam has its optical path changed at a right angle by the polarization beam splitter 35. The beam thus turned is guided into a condenser lens 38 and an optical detector 39. The information can be read out in dependence upon the amount of light having entered the optical detector. The aforementioned information reader may be multiplexed to raise the information transfer rate. On the other hand, the optical post card 20 may be of a both-side reading type by forming the information readers at the front and back sides thereof. For the data of the two sides of the optical post card 20, in this case, the post card 20 need not be turned upside down after it has been drawn out from the aforementioned optical sheet player.

Figure 11:
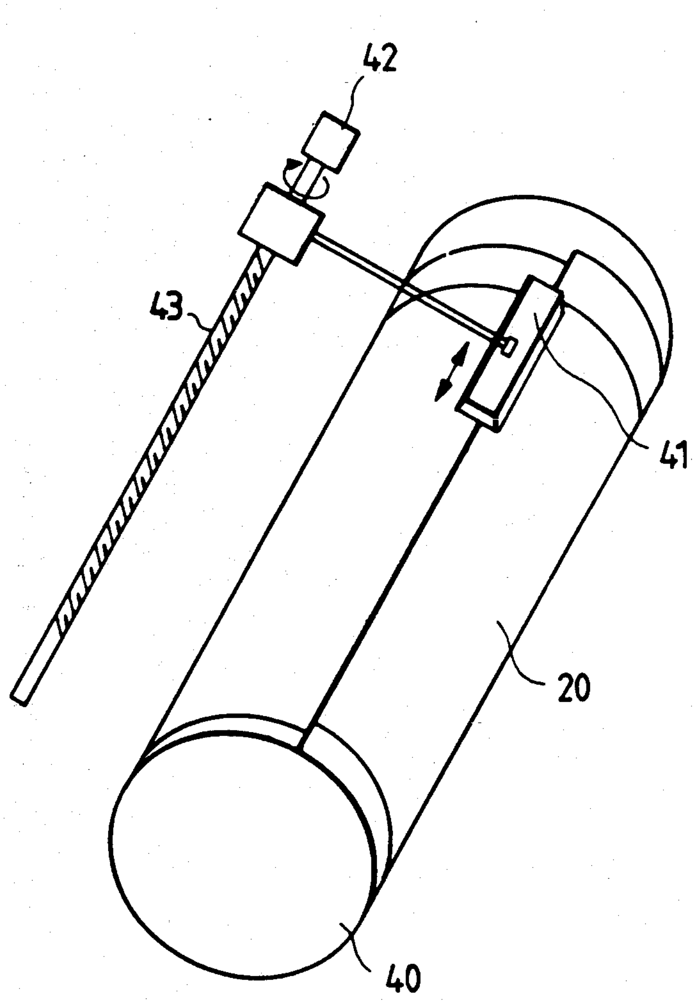
FIG. 11 is a diagram showing the structure of a third embodiment of the reading portion of the optical sheet player.

Next, another embodiment of the optical information reader will be described with reference to FIG. 11. The optical post card 20 is wound on a rotating drum 40 and is optically read out by a CCD sensor array 41. This CCD sensor array 41 is driven at a right angle with respect to the rotating direction of the drum 40 by a driver 43 through a position controller 42. As a result, the signals can be stably read out to transfer the information at a high speed. Alternatively, the rotating drum 40 may be made of a transparent material, and another CCD sensor array may be disposed in the drum 40. Then, the data of the two sides of the sheet-shaped recording medium can be simultaneously read out.

According to the present invention, the general information recorded in the recording medium having the post card shape can be printed in a great amount, and the required individual data suited for the respective receivers can be additionally printed. Thus, it is possible to realize direct mails which have different contents and much information.

For example, both a video program for several minutes containing four or five still color images and voices and music for several minutes and several thousands of characters can be simultaneously recorded as the general information and the required individual information, respectively. As a result, it is possible to send information answering the requests of the customers and to increase the interests of the receivers more than the mere direct mails to thereby enhance the publicity and advertisement.

What is claimed is:

1. A mail system comprising:

a composer selectively composing at least one of character information, image information and audio information;

a printer printing the composite information as optically readable bit information on a plurality of recording elements;

a first memory area storing specific information specifying at least one receiver of at least one of said recording elements;

a second memory area storing information identifying items required by said receiver;

a third memory area storing information related to the identified required items of said receiver;

a selector selecting information corresponding to said identified required items of said receiver from said third memory area;

a recorder recording said selected information corresponding to the required items of said receiver as optically readable bit information on said at least one of said recording elements; and a second recorder recording said specific information specifying said receiver on said at least one of said recording elements.

2. The mail system of claim 1, wherein said composer edits and composes the character information and the image information so that they may be simultaneously displayed when they are displayed and reproduced by a recording element player.

3. The mail system of claim 1, wherein said printer includes: a converter converting plural composite information into bit information;

a third recorder recording said bit information on a printing medium; and means for adjusting printing density to provide a desired density of bit information on said printing medium.

4. The mail system of claim 1, wherein said recorder records the bit information of the information to be recorded at a pitch different from a printing interval of bit information which has previously been printed on the recording element.

5. The mail system of claim 1, wherein said printer comprises means for editing a discriminatable image with a set of bit information before printing.

6. A mail system comprising:

a composer composing a composite information including at least one of character information, image information and audio information;

a printer printing said composite information as optically readable bit information on a plurality of recording elements;

means for storing specific information for specifying at least one receiver of at least one of said recording elements;

a first memory area storing information identifying the items required by said at least one receiver;

means for varying the items required by said at least one receiver;

a second memory area storing information related to the identified items required by said at least one receiver;

means for selecting information from said second memory area;

a first recorder recording the selected information as optically readable bit information on said at least one of said recording elements; and a second recorder recording said specific information specifying said receiver on said at least one of said recording elements.

7. The mail system of claim 6, wherein said composer edits and composes the character information and the image information so that they may be simultaneously displayed when they are displayed and reproduced by a recording element player.

8. The mail system of claim 6, wherein said printer comprises: a converter converting plural composite information into bit information;

a third recorder recording said bit information on a printing medium; and means for adjusting printing density to provide a desired density of bit information on said printing medium.

9. The mail system of claim 6, wherein said first recorder records the bit information of the information to be recorded at a pitch different from a printing interval of bit information which has previously been printed on the recording element.

10. The mail system of claim 6, wherein said printer comprises means for editing a discriminatable image with a set of bit information before printing.

11. A mail system comprising:

a composer composing a composite information including at least one of character information, image information and audio information;

a printer printing said composite information as optically readable bit information on a plurality of recording elements;

a first memory area storing specific information for specifying at least one receiver of at least one of said recording elements;

a second memory area storing information identifying the items required by said at least one receiver;

a third memory area storing information related to the identified required items of said at least one receiver;

a selector selecting information corresponding to the identified required items from said third memory area;

a first recorder recording both said selected information and at least a portion of said specific information as optically readable bit information on said at least one of said recording elements; and a second recorder recording a portion of said specific information as visibly recognizable information on said at least one of said recording elements.

12. The mail system of claim 11, wherein said composer edits and composes the character information and the image information so that they may be simultaneously displayed when they are displayed and reproduced by a recording element player.

13. The mail system of claim 11, wherein said printer comprises;

a converter converting plural composite information into bit information;

a second recorder recording said bit information on a printing medium; and means for adjusting printing density to provide a desired density of bit information on said printing medium.

14. The mail system of claim 11, wherein said first recorder records the bit information of the information to be recorded at a pitch different from a printing interval of bit information which has previously been printed on the recording element.

15. The mail system of claim 11, wherein saïd printer comprises means for editing a discriminatable image with a set of bit information before it prints.

16. A mail system comprising:

data memory storing at least one of character information, image information and audio information;

a composer selectively composing composite information from the information stored in said data memory;

a printer printing the composite information on a plurality of recording elements;

a first memory area storing specific information for specifying at least one receiver of at least one of said recording elements;

a second memory area storing items required by said at least one receiver;

a third memory area storing information related to the required items of said at least one receiver;

a selector selecting information corresponding to the required items for said at least one receiver from the information stored in said data memory;

a first recorder recording said selected information corresponding to the required items of said at least one receiver on at least one of said recording elements; and a second recorder recording the specific information on said at least one of said recording elements.

17. The mail system of claim 16, wherein said composer edits and composes the character information and the image information so that they may be simultaneously displayed when they are displayed and reproduced by a recording medium element.

18. A mail system comprising:

a data memory storing at least one of character information, image information and audio information;

a composer composing composite information from the information stored in said data memory;

a printer printing the composite information in a plurality of recording elements;

a first memory area storing specific information for specifying at least one receiver of at least one of said recording elements;

a second memory area storing information identifying items required by said at least one receiver;

means for varying the required items of said at least one receiver;

a third memory area storing information related to the required items of said at least one receiver;

a selector selecting information corresponding to the required items of said at least one receiver from the information stored in said data memory;

a first recorder recording the selected information on said at least one of said recording elements; and a second recorder recording the specific information on said at least one of said recording elements.

19. The mail system of claim 18, wherein said composer edits and composes the character information and the image information so that they may be simultaneously displayed when they are displayed and reproduced by a recording element player.

20. A mail system comprising:

a data memory storing at least one of character information, image information and audio information;

a composer composing composite information from the information stored in said data memory;

a printer printing the composite information as optically readable bit information on a plurality of recording elements;

a first memory area storing specific information for specifying at least one receiver of at least one of said recording elements;

a second memory area storing items required by said at least one receiver;

a third memory area storing information related to the required items of said at least one receiver;

a selector selecting information corresponding to the required items of said at least one receiver from the information stored in said data memory;

a first recorder recording the selected information on said at least one of said recording elements; and a second recorder recording the specific information on said at least one of said recording elements.

21. The mail system of claim 20, wherein said composer edits and composes the character information and the image information so that they may be simultaneously displayed when they are displayed and reproduced by a recording element player.

22. The mail system of claim 20, wherein said printer comprises:

a converter converting plural composite information into bit information;

a third recorder recording said bit information on a printing medium; and means adjusting printing density to provide a desired density of bit information on said printing medium.

23. The mail system of claim 20, wherein said first recorder records the bit information of the information to be recorded at a pitch different from a printing interval of the bit information which has already been printed on the recording element.

24. The mail system of claim 20, wherein said printer comprises means for editing a discriminatable image with a set of bit information before it prints.

25. A mail system comprising:

a data memory storing at least one of character information, image information and audio information;

a composer composing composite information from the information stored in said data memory;

a printer printing the composite information as optically readable bit information on a plurality of recording elements;

a first memory area storing specific information for specifying at least one receiver of at least one of said recording elements;

a second memory area storing items required by said at least one receiver;

a third memory area storing information related to the required items of said at least one receiver;

a selector selecting information corresponding to the required items of said at least one receiver from the information stored in said data memory;

a first recorder recording both the selected information and at least a portion of the specific information on said at least one of said recording elements; and a second recorder recording a second portion of said specific information as visibly recognizable information on at least one of said recording elements.

26. The mail system of claim 25, wherein said composer edits and composes the character information and the image information so that they may be simultaneously displayed when they are displayed and reproduced by a recording element player.

27. The mail system of claim 25, wherein said printer comprises:

a converter converting plural composite information into bit information;

a third recorder recording said bit information on a printing medium; and means for adjusting printing density to provide a desired density of said bit information on said printing medium.

28. The mail system of claim 25, wherein said first recorder records the bit information of the information to be recorded at a pitch different from a printing interval of the bit information which has previously been printed in the recording medium.

29. The mail system of claim 25, wherein said printer comprises means for editing a discriminatable image with a set of bit information before it prints.

30. A mail system comprising:

a data memory storing at least one of character information, image information and audio information;

means for inputting at least one of said character information, image information and audio information;

a composer composing composite information from the information stored in said data memory and the information inputted from said means for inputting;

a first printer printing the composite information on a plurality of recording elements;

a first memory area storing specific information for specifying at least one receiver of at least one of said recording elements;

a second memory area storing items required by said at least one receiver;

a third memory area for storing information related to the required items of said at least one receiver;

a selector selecting information corresponding to the required items of said at least one receiver from the information stored in said data memory;

a first recorder recording the selected information on said at least one of said recording elements; and a second recorder recording the specific information on said at least one of said recording elements.

31. The mail system of claim 30, wherein said composer edits and composes the character information and the image information so that they may be simultaneously displayed when they are displayed and reproduced by a recording element player.

* * * * *

UNITED STATES PATENT AND TRADEMARK OFFICE

CERTIFICATE OF CORRECTION

PATENT NO. : 5,018,072

DATED : May 21, 1991

INVENTOR(S) : Masahiko Imamoto,et. al.

It is certified that error appears in the above-identified patent and that said Letters Patent is hereby corrected as shown below:

Column 1, line 68, Before "those" delete "the".

Column 2, line 1, Change "enhance" to --enhancing--.

Column 2, line 25, Change "diagrams schematic" to --schematic diagrams--.

Column 5, lines 23-24 Change "are as they are the reproduced information" to --can be accurately reproduced--.

Column 5, line 44 Change "surely" to --correctly--.

Signed and Sealed this

Twenty-ninth Day of December, 1992

*Attest:*

DOUGLAS B. COMER

*Attesting Officer*

*Acting Commissioner of Patents and Trademarks*